Figure 1:
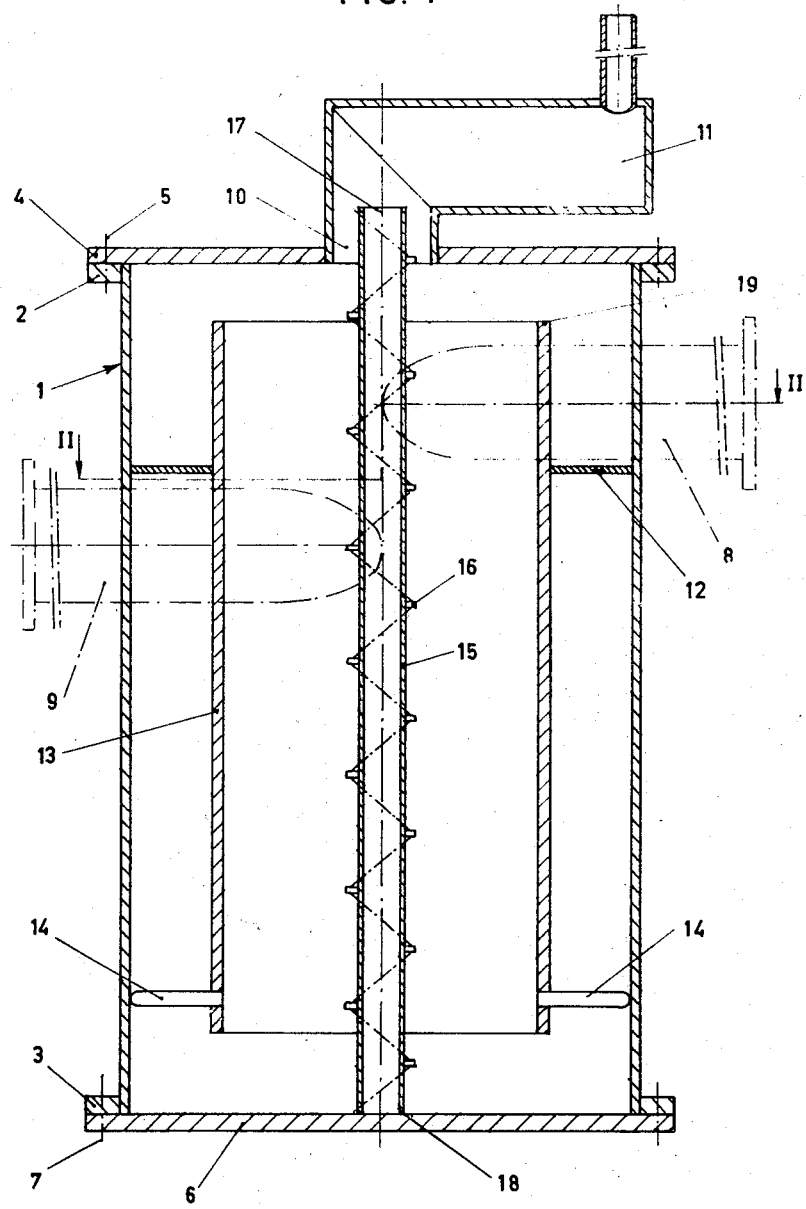

United States Patent [19]

Wisman et al.

[11] 3,771,288
[45] Nov. 13, 1973

[54] DEVICE FOR DEGASSING A LIQUID

[75] Inventors: Gerrit Marinus Wisman; Pieter Adam Van Rijs, both of Apeldoorn, Netherlands

[73] Assignee: Nederlandse Organisatie Voor Toegepast Natuurwelenschappelijk Onderzoek Ten Behoeve Van Nijverheid, The Hague, Netherlands

[22] Filed: Oct. 8, 1971

[21] Appl. No.: 187,828

[52] U.S. Cl. ................................................ 55/204
[51] Int. Cl. ........................................ B01d 19/00
[58] Field of Search ............... 55/41, 52, 66, 92, 55/191, 204, 205; 210/512

[56] References Cited
UNITED STATES PATENTS

| | | | |
|---|---|---|---|
| 2,059,522 | 11/1936 | Hawley | 55/DIG. 22 |
| 2,835,343 | 5/1958 | Wolff et al. | 55/66 |
| 2,983,331 | 5/1961 | Helsley, Jr. | 55/204 |
| 3,088,595 | 5/1963 | Robb | 55/204 X |
| 3,127,255 | 3/1964 | Winslow | 55/204 X |
| 3,359,708 | 12/1967 | Barber | 55/205 X |

Primary Examiner—Samih N. Zaharna
Assistant Examiner—R. W. Burks
Attorney—Hammond & Littell

[57] ABSTRACT

The invention relates to a device for degassing liquids, while applying a cyclone, in particular for removing an inert gas such as argon from liquid sodium, comprising a cylindrical container provided with a tangential supply duct for the liquid to be degassed, a central discharge for the gas at the upper side of the container, a cyclone mantle and a discharge duct for the degassed liquid, wherein at the inner side of the container wall a horizontal partition is provided that lies under the tangential supply duct of the liquid, at which partition a cylindrical cyclone mantle is attached that is concentrical with this container, which cyclone mantle is open at the upper and lower sides and whose upper edge lies over the supply duct and whose lower edge is situated near the bottom of the container, while at a slight distance under the partition the discharge duct for the degassed liquid is connected to the space between the cyclone inner mantle and the container wall.

3 Claims, 2 Drawing Figures

DEVICE FOR DEGASSING A LIQUID

The invention relates to a device for degassing liquids while applying a cyclone, in particular for removing an inert gas such as argon from liquid sodium, to be applied in a cooling circuit of a rapid sodium-cooled reactor.

Devices in which a gas is separated from a liquid with the aid of cyclonic action are known in the art.

Such cyclones in general consist of a cylindrical or conical funnel-shaped container or mantle, tapering downwards, to which alongside the upper side of the container one or more tangential supply ducts are connected for the liquid to be purified.

Then in the centre at the upper side of the container the discharge pipe is situated for the gas to be separated and then near the lower side of the container the discharge for the purified liquid is provided that can be mounted tangentially or axially to the container, whereas in the latter case near or in the discharge opening blade-shaped means can be provided.

Then the separation of the two components, the gas and the liquid, is effected because the heavy particles of liquid are pushed towards the wall of the cyclone, as a result of the centrifugal force of the mixture performing a circular movement within the cyclone, and the lighter particles of gas are pushed towards the axis of the cyclone.

Hence in the core area of the mantle a vortex pattern is generated in which the gas particles can escape from the flow of liquid and can be discharged upwardly.

These devices known in the art have disadvantages, however.

In the cyclone a strong downwardly directed flow is generated because of the throughput flowing through the device. In order to increase the separation of gas as much as possible under these conditions a long cyclone has to be used so as to prevent entrainment of gas bubbles towards the liquid discharge. This has the drawback that liquid supply and discharge ducts come to lie far apart.

Nor have the so-called "cones," conical trap discs, applied in this connection, that serve to restrict the penetration of the gas bubbles as far as the bottom of the vortex and to prevent entrainment into the flow of liquid, been found efficient in practice.

In particular the smaller gas bubbles are still entrained downwardly in the strong flow and stand no chance of rising and escaping via the central gas discharge. Moreover, in the core an amount of gas bubbles remains floating constantly.

Since in particular in degassing liquid sodium it should be prevented as much as possible that gas particles are entrained in the sodium discharge the device known in the art are totally insufficient for the separation mentioned above.

Now the object of the device according to the invention is to remove the above-mentioned drawbacks and to provide a device in which also the lighter gas bubbles that are situated in the core area can rise and escape.

With the aid of the device according to the invention further a degasser is obtained in which the length of the degasser can be kept relatively small in respect of the diameter with a slight difference in height between the supply and discharge ducts of the liquid to be purified, whereas yet the separation traject necessary for an adequate separation can be maintained.

Further the device according to the invention is reliable and can handle efficiently great amounts of gas passing through suddenly (peak load).

Therefore, in the device according to the invention at the inner side of the cylindrical container of the degasser is provided a horizontal partition, which lies below the tangential supply duct of the liquid, and to which is connected a cylindrical cyclone inner mantle, which is open at the bottom and at the top and which is concentrical with this container, and whose upper edge lies over the supply duct and whose lower edge is situated near the bottom of the container, whereas at a slight distance below the partition the discharge duct for the degassed liquid is connected to the space between the cyclone inner mantle and the container wall. As a result of this construction of the degasser and the arrangement shown of the inner mantle and the supply and discharge ducts a good an adequate cyclonic action can be obtained.

The tangential supply into the container or outer mantle of the degasser enables the liquid to be purified to flow into the cyclone space over the entire upper circumference of the inner cylinder. This results in the creation of a stable vortex due to the symmetric feeding.

With this construction most gas escapes already directly over the upper edge of the inner mantle and passes under the cover plate of the container to the gas discharge duct.

By placing also the discharge duct for the degassed liquid in the outer mantle, while retaining a long flow path, a slight difference in height between the supply and discharge ducts may yet suffice.

With this construction the vortex pattern known at a cyclonic action will mainly be formed in the inner mantle.

With the device according to the invention the discharge duct for the gas is situated centrally over the upper edge of this cyclone inner mantle, and has a diameter that is considerable smaller than the diameter of this mantle.

The gas bubbles released in the vortex in the centre of the inner mantle, therefore, will be able to escape straight upwards via this gas discharge.

In order to promote the rising movement of the gas bubbles from the vortex area in the device according to the invention in the cyclone inner mantle a central body is mounted, which outwardly is provided with at least one helical rib, which body extends from below the lower edge of the inner mantle into the discharge duct for the gas.

In the device according to the invention, this helical rib has a course that has a direction opposite to the direction of rotation effected by the tangential supply duct in the liquid to be degassed.

This helical rib causes a delay in velocity in the core area of the vortex, so that the smaller gas bubbles, too, are released from the liquid and rise.

It should be remarked still that with cyclones for gas purification, application of a helical displacer in a central axis is known in the art. Such a displacer, however, then has a totally different function and serves with the gas purifiers to raise the velocity of the heavier component, so the impurities in the gas, in order to centrifuge these out before the gas is carried off upwards.

The device according to the invention will be further described below and elucidated with reference to a drawing, in which an embodiment of the device is shown.

In this drawing

Figure 2:
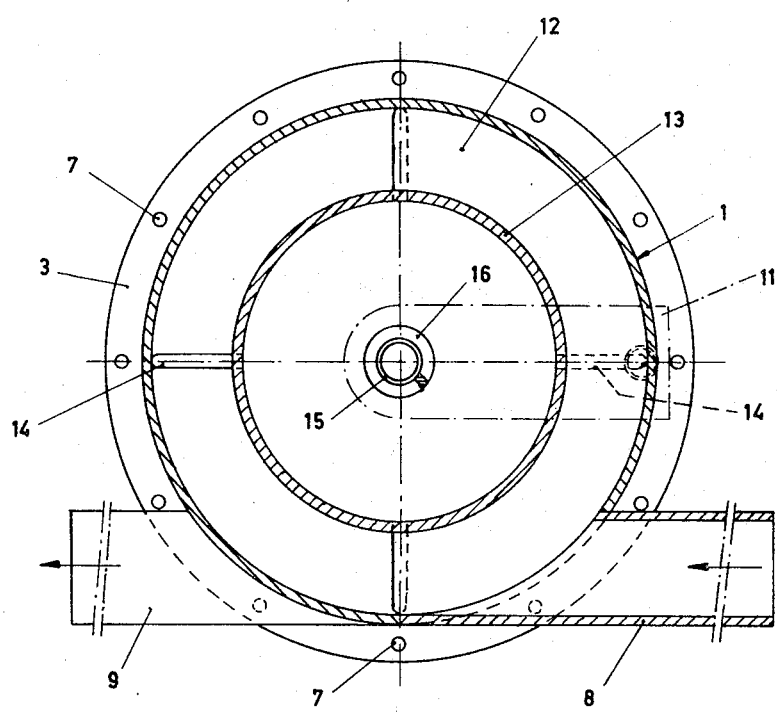

FIG. 1 gives a longitudinal section of the device and FIG. 2 a cross-section along line II—II in FIG. 1.

In FIG. 1, 1 is the cylindrical container of the degasser, which is provided with flange 2 for connecting cover lid 4 with bolts 5 and flange 3 for connecting bottom plate 6 with bolts 7.

Container 1 is provided with a tangential supply duct 8 for the liquid to be degassed and a tangential discharge duct 9 for the degassed liquid.

In cover lid 4 there is provided central discharge duct 10 for the gas towards gas trap 11.

At the inner side of the container and round about it a partition 12 is provided, in which a cylindrical cyclone inner mantle 13 is suspended concentrically.

With the aid of displacers 14 this inner mantle is centreted at the lower side within the container.

In the centre line of the container and the inner mantle a central body 15 is mounted, which outwardly is provided with a helical rib 16 and whose course is opposite to the direction the liquid takes when it flows in through tangential supply duct 8.

Upper end 17 of this body extends into central gas discharge duct 10 and lower side 18 reaches beyond the lower edge of the inner mantle and ends on bottom plate 6.

The liquid flows tangentially into the container via supply duct 8 so that the entire container fills primarily round about the upper side.

The centrifugal action occurring here will allow an important part of the gas that is present in the liquid to escape primarily already past cover lid 4 and central gas discharge duct 10 towards gas trap 11.

Because of the partition provided between the container and the inner mantle the flow of liquid will be led over upper edge 19 of the inner mantle and in this inner mantle make a downwardly directed helicoidal movement past the inner wall of this mantle.

In the process, in the inner mantle a vortex pattern is created in which the gas that is being released from the flow of liquid proceeds to the core.

Central body 15 arranged in this core zone will check and retard the downward entrainment due to the course of its external helical rib, so that the gas bubbles come to a standstill, liberate themselves from the liquid and escape via the central gas discharge duct.

The central body reaches as far as the bottom plate of the degasser space so that a maximum effect of the above action is obtained.

Now the liquid flows between inner mantle 13 and outer mantle 1 towards tangential discharge duct 9, which is provided at a slight distance under partition 12.

Because of the application of the container with concentric inner mantle it is achieved that on the one hand the path of flow and so the degassing traject of the liquid is long enough for a safe action of the degasser, while on the other hand the device according to the invention can be rather short in respect of the devices known in the art with a slight difference in height between the supply and discharge ducts for the liquid.

When the device described above is applied for degassing liquid sodium, as far as is possible welded joints instead of screwed or bolted joints respectively will be applied for the parts composing the degasser.

We claim:

1. A device for degassing liquids, while applying a cyclone, in particular for removing an inert gas such as argon from liquid sodium, comprising a cylindrical container provided with a tangential supply duct for the liquid to be degassed, a central discharge for the gas at the upper side of the container, a cyclone mantle and a discharge duct for the degassed liquid, wherein at the inner side of the container wall a horizontal partition is provided that lies under the tangential supply duct of the liquid, at which partition a cylindrical cyclone mantle is attached that is concentric with this container, which cyclone mantle is open at the upper and lower sides and whose upper edge lies over the supply duct and whose lower edge is situated near the bottom of the container, while at a slight distance under the partition discharge duct for the degassed liquid is connected to the space between the cyclone inner mantle and the container wall.

2. A device according to claim 1, wherein the control discharge duct for the gas is situated centrally over the upper edge of the cyclone inner mantle and has a diameter that is considerably smaller than the diameter of the inner mantle.

3. A device according to claim 1, wherein in the centre line of the cyclone inner mantle a central body is mounted that externally is provided with at least one helical rib whose course is opposite to the direction of rotation of the liquid, which rotation is effected by the tangential supply duct.

* * * * *

PO-1050
(5/69)

UNITED STATES PATENT OFFICE
CERTIFICATE OF CORRECTION

Patent No. 3,771,288      Dated November 13, 1973

Inventor(s) Gerrit Marinus Wisman and Pieter Adam Van Rijs

It is certified that error appears in the above-identified patent and that said Letters Patent are hereby corrected as shown below:

IN THE PATENT

| Column | Line | |
|---|---|---|
| 1 | | After "[21] Appln.: 187,828", please insert the following:<br><br>-- [30] Foreign Application Priority Data<br>October 13, 1970  The Netherlands ... 70-14976 -- |

IN THE PATENT APPLICATION

| Column | Line | Claim | Line | |
|---|---|---|---|---|
| 4 | 30 | 1 | 10 | "concentric" should read -- concentrical --. |

Signed and sealed this 9th day of July 1974.

(SEAL)
Attest:

McCOY M. GIBSON, JR.
Attesting Officer

C. MARSHALL DANN
Commissioner of Patents